United States Patent
Pruden et al.

(10) Patent No.: US 7,455,515 B2
(45) Date of Patent: Nov. 25, 2008

(54) NOZZLE AND APPARATUS FOR INJECTION MOLDING

(75) Inventors: Trevor Pruden, Windsor (CA); Frederick G. Steil, Lake Orion, MI (US); Frank J. Eigler, Windsor (CA)

(73) Assignee: D-M-E Company, Madison Heights, MI (US)

( * ) Notice: Subject to any disclaimer, the term of this patent is extended or adjusted under 35 U.S.C. 154(b) by 290 days.

(21) Appl. No.: 11/456,626

(22) Filed: Jul. 11, 2006

(65) Prior Publication Data

US 2006/0240141 A1    Oct. 26, 2006

Related U.S. Application Data

(63) Continuation-in-part of application No. 11/007,756, filed on Dec. 8, 2004, now Pat. No. 7,220,117.

(51) Int. Cl.
B29C 45/20 (2006.01)

(52) U.S. Cl. .................. 425/562; 425/564; 425/567; 425/574

(58) Field of Classification Search .................. 425/562, 425/564, 567, 574
See application file for complete search history.

(56) References Cited

U.S. PATENT DOCUMENTS

| | | | |
|---|---|---|---|
| 3,295,169 A | 1/1967 | Moslo | |
| 3,401,426 A | 9/1968 | Evans | |
| 3,934,626 A | 1/1976 | Hall | |
| 3,941,540 A | 3/1976 | Driscoll et al. | |
| 4,073,469 A | 2/1978 | Kodric | |
| 4,076,485 A | 2/1978 | Sokolow | |
| 4,082,226 A | 4/1978 | Appleman et al. | |
| 4,212,626 A | 7/1980 | Gellert | |

(Continued)

FOREIGN PATENT DOCUMENTS

CH    360310    2/1962

(Continued)

OTHER PUBLICATIONS

Written Opinion of the International Searching Authority issued in PCT/US2007/004647.

(Continued)

*Primary Examiner*—Yogendra Gupta
*Assistant Examiner*—Emmanuel S Luk
(74) *Attorney, Agent, or Firm*—John W. Gregg

(57) ABSTRACT

A sprue bar nozzle assembly for controlling flow of melt through conduits of a mold assembly for injection molding comprises a sprue bar extension and nozzle, the sprue bar extension comprising means for adjusting the overall length of the sprue bar nozzle assembly and the nozzle comprising a nose comprising a seating surface for mating engagement with a mating surface of a mating segment of a melt conveying conduit and a slide valve, an open position of the slide valve permitting melt to flow through the sprue bar nozzle assembly and a closed position preventing melt from flowing through the sprue bar nozzle assembly, the slide valve being biased to a closed position by a biasing means and being driven to the open position by forces applied to the nose of the nozzle as a result of closure of an associated mold assembly.

20 Claims, 4 Drawing Sheets

U.S. PATENT DOCUMENTS

| | | | |
|---|---|---|---|
| 4,333,608 | A | 6/1982 | Hendry |
| 4,427,361 | A | 1/1984 | Saito |
| 4,678,427 | A | 7/1987 | Fritzsche |
| 4,971,747 | A | 11/1990 | Sorensen |
| 5,012,839 | A | 5/1991 | Rogers et al. |
| 5,225,217 | A | 7/1993 | Wisen et al. |
| 5,229,145 | A | 7/1993 | Brown et al. |
| 5,380,188 | A | 1/1995 | Ullisperger |
| 5,458,843 | A | 10/1995 | Brown et al. |
| 6,050,544 | A | 4/2000 | Meronek |
| 6,348,171 | B1 | 2/2002 | Dewar et al. |
| 6,409,955 | B1 | 6/2002 | Schmitt et al. |
| 6,575,731 | B1 | 6/2003 | Olaru et al. |

FOREIGN PATENT DOCUMENTS

| | | |
|---|---|---|
| FR | 2831644 A1 | 5/2003 |
| GB | 498653 | 1/1939 |
| JP | 51-102047 | 9/1976 |
| JP | 08020043 | 1/1996 |
| WO | 2006062539 | 12/2007 |

OTHER PUBLICATIONS

Patent Abstracts of Japan, Abstract of JP08020043.

NOZZLE AND APPARATUS FOR INJECTION MOLDING

This application is a continuation-in-part of U.S. patent application Ser. No. 11/007,756 filed 8 Dec. 2004 entitled "Nozzle and Apparatus for Injection Molding", now U.S. Pat. No. 7,220,117.

I. BACKGROUND OF THE INVENTION

1. Field of the Invention

This invention relates generally to injection molding. In particular, this invention relates to assemblies for controlling flow of melt through conduits between an injection unit and mold cavities.

2. Description of Related Art

Injection molding is a cyclic process wherein mold assemblies defining mold cavities are operable between "open" and "closed" conditions, the open condition permitting release of molded articles and the closed condition permitting filling of the cavities with material to be molded. Mold assemblies comprise mating mold components comprising a primary core component and primary cavity component, the primary core component and primary cavity component meeting along a so called "parting line" when the mold assembly is closed. The mating mold components define cavities establishing the shape and size of articles to be molded. A mold assembly within the press unit of a molding machine is illustrated in FIG. 1a. Filling of cavities is effected by forcing flowable material, e.g. molten metal, rubber or thermoplastic (known as "melt"), from an injection unit through conduits to the mold cavities. Once filled, the mold assembly is held closed while the molten material solidifies and is opened to allow removal of molded articles when the material has sufficiently solidified to retain the molded form without unacceptable distortion when the material is unsupported.

Improved productivity of injection molding is achieved by providing mold arrangements comprising plural mold assemblies having plural parting lines within a single injection molding machine mold clamping unit. In such arrangements mating mold components are carried on intermediate movable platens interposed between a stationary platen and a primary movable platen defining the machine clamping unit of the injection molding machine. Such arrangements are known as "stack molds" or "dual molds" and FIG. 1b illustrates such a mold arrangement in the press unit of a molding machine. Melt is conveyed from the injection unit to the mold cavities through conduits that must accommodate cyclic separation and joining of the mating mold components. Such conduits are sometimes referred to as sprue bars. It is known to provide means to retain melt within sprue bar segments while the mold assemblies are "open" (mating mold components separated). Such means may comprise valves to seal retained melt within the sprue bar segments or extending members to effectively depressurize retained melt relieving forces that otherwise would propel melt out of the sprue bar segments. Melt depressurization depends on achieving sufficient volumetric increase with mold opening to insure melt is retained within the sprue bar segments. Known devices rely on melt pressure to effect volumetric increase. In the event mold opening is completed before melt depressurization, melt can leak from the unsealed sprue bar segment. Independently actuated valves may be provided to seal the sprue bar segments independently mold opening. The added complexity of actuators for such valves increase the overall costs of mold assemblies so equipped. Hence it is desirable to provide for sealing sprue bar segments by devices which are passively actuated with opening of the associated mold assembly so as to overcome the disadvantages of the known devices.

II. SUMMARY OF THE INVENTION

It is an object of the present invention to provide a sprue bar nozzle assembly for controlling flow of melt through conduits of injection molding equipment, the passage of melt therethrough being controlled by a valve comprising the nozzle and opened and closed by opening and closing of a mold assembly, the overall length of the sprue bar nozzle assembly being adjustable.

It is a further object of the present invention to provide an apparatus for controlling flow of melt through a mold arrangement comprising plural mold assemblies, the apparatus comprising at least one conduit for conveying melt from an injection unit to at least one mold assembly, the conduit comprising mating segments abutted with closure of the mold assemblies and separated with opening of the mold assemblies, at least one of the mating segments comprising a sprue bar nozzle assembly comprising a valve for controlling passage of melt therethrough wherein the valve is actuated by opening and closing of the mold assemblies and the overall length of the sprue bar nozzle assembly being adjustable Further objects and advantages of the invention shall be made apparent from the accompanying drawings and the following description thereof.

In accordance with the aforesaid objects the present invention provides a sprue bar nozzle assembly for controlling flow of melt through conduits of a mold assembly, the sprue bar nozzle assembly comprising a sprue bar extension and a nozzle in fluid communication with the sprue bar extension for controlling flow of melt through the sprue bar extension, the sprue bar extension comprising means for adjusting the overall length of the sprue bar nozzle assembly, the nozzle comprising a nozzle valve bore, a nose comprising a seating surface for engagement with a mating surface of a mating segment of a melt conveying conduit and a nozzle slide valve received within the nozzle valve bore and having a valve passage in fluid communication with one of a nozzle inlet and nozzle outlet and terminating in orifices that are covered or exposed according to the location of the slide valve relative to the other of the nozzle inlet and nozzle outlet, an open position of the slide valve permitting melt to flow through the slide valve and nozzle and a closed position preventing melt from flowing through the slide valve and nozzle, an arm projecting from the nozzle slide valve transverse to and passing through an opening in the nozzle, opposed ends of the arm extending beyond the nozzle valve bore, and a biasing means, the biasing means applying a force to the arm in the direction to locate the slide valve to cover the orifices, the nozzle being mounted so that the slide valve is driven to the open position by forces applied to the nose as a result of closure of an associated mold assembly. An apparatus for injection molding in a mold arrangement comprising plural mold assemblies comprises at least one conduit for conveying melt from an injection unit to at least one mold assembly, the conduit comprising mating segments abutted with closure of the mold assemblies and separated with opening of the mold assemblies, at least one of the mating segments comprising a sprue bar nozzle assembly in accordance with the invention.

III. BRIEF DESCRIPTION OF THE DRAWINGS

FIG. 3a is a partial sectional view of the sprue bar nozzle assembly of FIG. 2a taken along line 3a-3a of FIG. 2a.

IV. DETAILED DESCRIPTION OF THE PREFERRED EMBODIMENT

The invention shall be illustrated with reference to a preferred embodiment which shall be described in detail. It is not the intention of applicant that the invention be limited to the preferred embodiment, but rather that the invention shall be defined by the appended claims and all equivalents thereof.

Figure 1A:
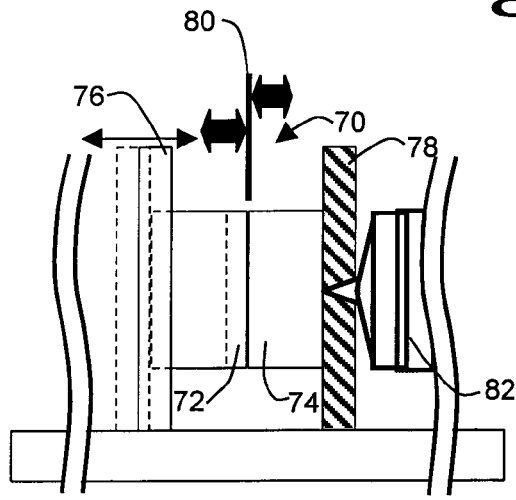
FIGS. 1a and 1a illustrate mold assemblies within press units of molding machines

Referring to FIG. 1a, a mold assembly 70 comprises a primary core component 72 and a primary cavity component 74. Primary core component 72 is supported by movable platen 76, and primary cavity component 74 is supported by stationary platen 78. Mold assembly 70 has parting line 80. Movable platen 76 and stationary platen 78 comprise a press unit of an injection molding machine. Movable platen 76 is moved to open and close mold assembly 70, an open position of movable paten 76 being shown in phantom (dashed line) in FIG. 1a. Melt is injected to mold assembly 70 from an injection unit 82, admitting melt through a passage in stationary platen 78 as illustrated by the cross-section thereof shown in FIG. 1a. Primary core component 72 and primary cavity component 74 advantageously define plural mold cavities (not shown). Distribution of melt to those cavities is advantageously effected by a configuration of conduits and nozzles (not shown in FIG. 1a) receiving melt at the passage through stationary platen 78 and conveying melt through the nozzles to the cavities.

Figure 1B:
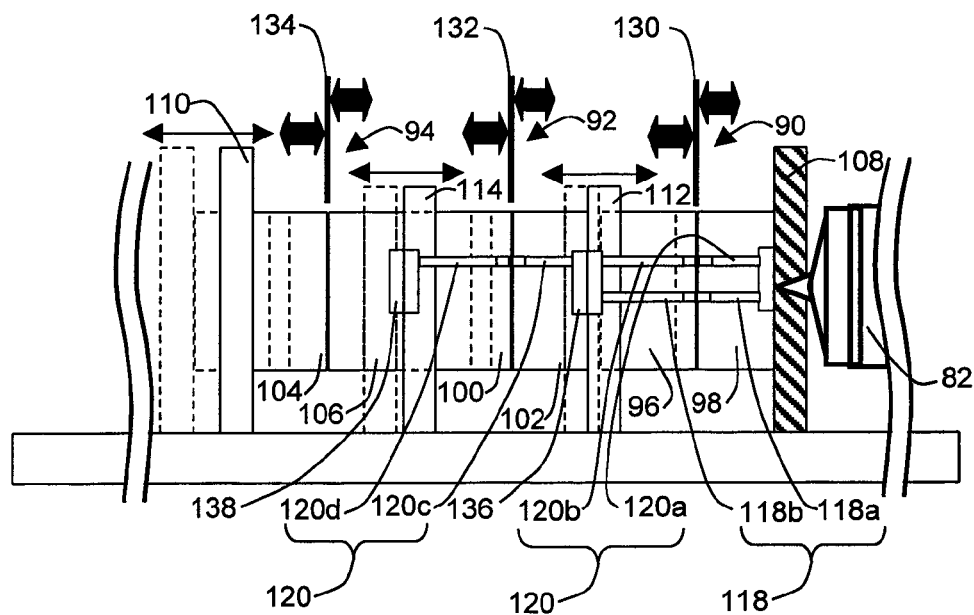

Referring to FIG. 1b, mold assemblies 90-94 have parting lines 130-134, respectively; mold assembly 90 comprises primary core component 96 and primary cavity component 98; mold assembly 92 comprises primary core component 100 and primary cavity component 102; and mold assembly 94 comprises primary core component 104 and primary cavity component 106. Movable platen 110 and stationary platen 108, together with intermediate movable platens 112 and 114 compose a press unit of an injection molding machine. Movable platen 110, movable intermediate platen 114, and movable intermediate platen 112 are moved to open and close mold assemblies 90-94, an open position of movable paten 110 and intermediate movable platens 112 and 114 is shown in phantom (dashed line) in FIG. 1b. Primary cavity component 98 is supported by stationary platen 108, primary core component 104 is supported by movable platen 110, primary cavity component 106 and primary core component 100 are supported by intermediate movable platen 114; and primary cavity component 102 and primary core component 96 are supported by intermediate movable platen 112. Melt is injected from injection unit 82 via a passage through or conduit around stationary platen 108 to mold assembly 90; via conduit pair 118a and 118b comprising conduit 118 through junction 136 to conduits comprising mold assembly 92; and via conduit pair 120a and 120b comprising conduit 120 to junction 136 and from junction 136 via conduit pair 120c and 120d comprising conduit 120 through junction 138 to conduits comprising mold assembly 74. Conduit pairs 118a and 118b, 120a and 120b, and 120c and 120d comprise so call "sprue bar" segments, the segments of each pair separating and mating with operation of the stack mold assembly. Although illustrated as meeting proximate the mold parting lines 130 and 132, respectively, the segments of each pair may meet anywhere within the length between the supports for the segments. Heaters are advantageously applied to conduits 120 and 118 as well as conduits comprising intermediate platens 112 and 114 to maintain a flowable state of melt contained therein throughout a molding cycle. Notwithstanding that molding material has solidified in the mold cavities, melt remains fluid within such conduits requiring control to prevent leakage therefrom on opening of the mold assemblies. Advantageously, nozzles in accordance with the invention (not shown in FIG. 1b) can be applied to control the flow of melt from injection unit 82 to mold assemblies 90-94 as will be more fully described herein.

Figure 2A:
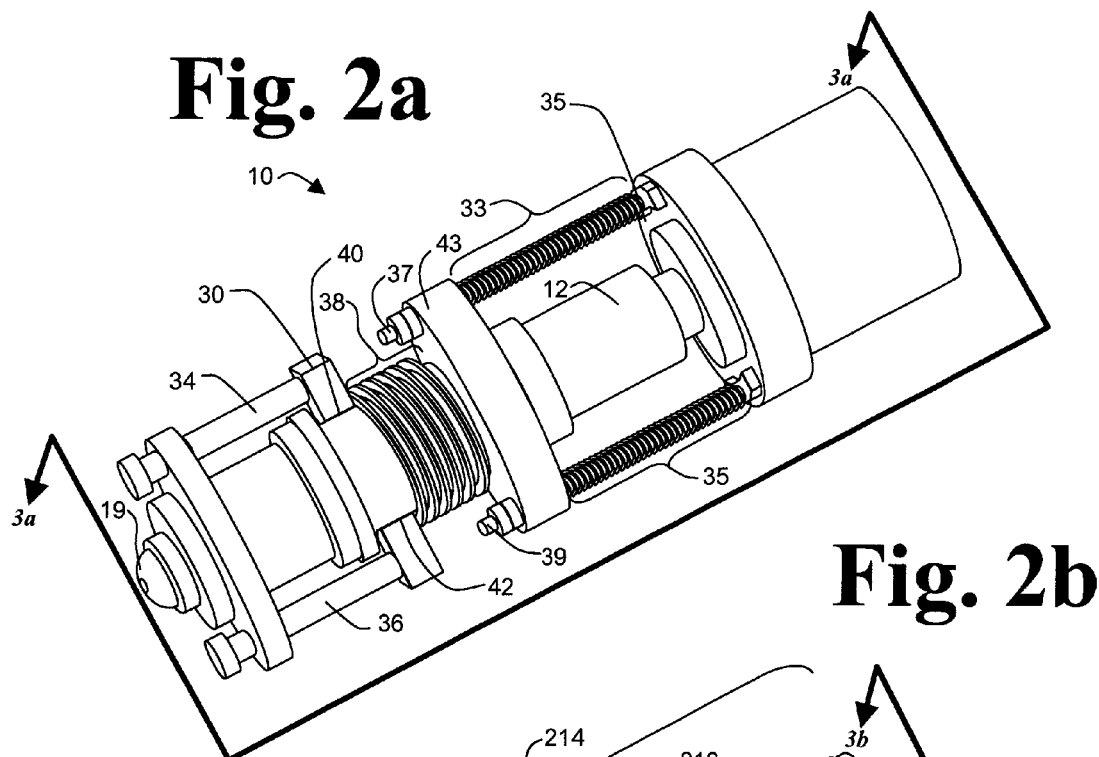
FIGS. 2a and 2b are three dimensional views of sprue bar nozzle assemblies in accordance with the invention.
Figure 3A:
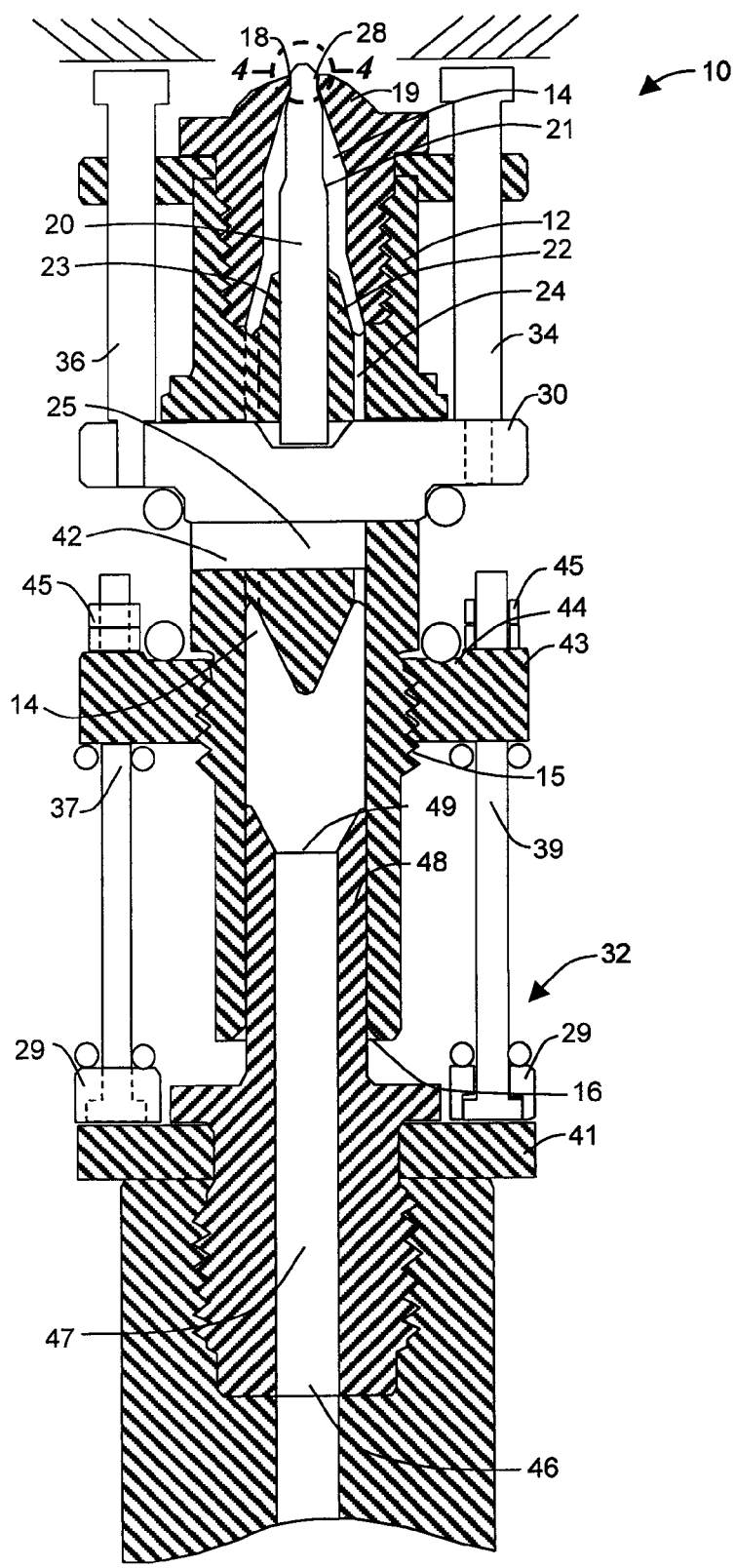

Referring to FIGS. 2a and 3a, a nozzle 10 comprises nozzle body 12 having a nozzle passage 14 therethrough joining nozzle inlet 16 and nozzle outlet 18 comprising nozzle tip 19. A valve pin guide 22 comprising nozzle body 12 is interposed between nozzle inlet 16 and nozzle outlet 18. At least one passage through valve pin guide 22, such as guide passage 24, is in communication with the portions of nozzle passage 14 separated by valve pin guide 22. Guide passages 24 enable flow of melt between nozzle inlet 16 and nozzle outlet 18. A valve pin 20 is movably supported in bore 23 of valve pin guide 22. Bore 23 is open at the end of valve pin guide 22 proximate nozzle outlet 18. Valve pin 20 comprises valve end 28 sized to form a seal at nozzle outlet 18 and at least one diametrical step, such as step 21, providing a reaction surface for forces from pressurized melt within nozzle passage 14. The end of valve pin 20 opposite valve end 28 abuts or is attached to contact arm 30. Contact arm 30 is transverse to valve pin guide 22 and passes through opening 25 therein. Opposed ends of contact arm 30 project beyond nozzle passage 14 through openings 40 and 42 in nozzle body 12. None of openings 40, 42 or 25 intersect guide passages 24. Hence, openings 40, 42 and 25 do not connect with melt conveying passages within nozzle 10.

Continuing with reference to FIGS. 2a and 3a, contact arm 30 comprises contact pins 34 and 36 attached to contact arm 30 by, for example, threaded engagement therewith as by threaded ends of each of contact pins 34 and 36 engaging a threaded bore in contact arm 30. The opposite ends of contact pins 34 and 36 are exposed for contact with surfaces illustrated schematically in FIG. 3. Spring 38 is located on the periphery of nozzle body 12. One end of spring 38 abuts contact arm 30 and the other end of spring 38 abuts shoulder 44 on nozzle body 12. Spring 38 provides a biasing force to hold valve pin 20 in the closed position shown in FIG. 3. Nozzle body 12 is mounted so that on closure of a mold assembly, the free ends of contact pins 34 and 36 will contact a surface (shown schematically in FIG. 3a) as a result of relative motion between nozzle body 12 and the surface. Thereafter, continued relative motion of nozzle body 12 and the surface to reduce the distance therebetween will overcome the force of spring 38 to effect motion of contact pins 34 and 36 and contact arm 30 relative to nozzle body 12 away from nozzle tip 19 to a valve pin open position. With valve pin 20 attached to contact arm 30, this relative movement of contact arm 30 separates valve end 28 from nozzle outlet 18. Alternatively, were valve pin 20 not attached to contact arm 30, relative movement of contact arm 30 permits separation of valve end 28 from nozzle outlet 18 when the force acting on reaction surfaces of valve pin 20 from melt pressure within nozzle passage 14 is sufficient to drive valve pin 20 away from tip 19. With the mold assembly fully closed, the distance between nozzle body 12 and the surface will be at a minimum and valve pin 20 will be located within nozzle passage 14 at an open position (not shown). The open position of valve pin 20 enables flow of melt through nozzle 10, flowing through guide passages 24 between nozzle inlet 16 and nozzle outlet 18. On opening of the mold assembly, the distance between nozzle body 12 and the surface increases and contact pins 34 and 36 are restored to the position shown in FIG. 3 by the force of spring 38 acting on contact arm 30. Hence, the spring functions as a biasing means to hold nozzle 10 closed, i.e. to hold valve pin 20 in a closed position whenever a force is not applied to contact arm 30 to overcome the spring force.

Melt retained in nozzle 10 is maintained in a suitable flowable condition by transfer of heat to the melt from nozzle body 12. Heat may be supplied from a mold assembly component to which nozzle 10 is mounted or from supplemental heaters (not shown) applied to the periphery of nozzle body 12 or installed internally therein. To relieve pressure associated with heating of retained melt, nozzle 10 advantageously comprises means to move valve pin 20 to an open position in the event internal pressure from retained melt exceeds a predetermined limit. As shown, valve pin 20 comprises at least one step 21 intermediate valve end 28 and contact arm 30 providing a reaction surface on which forces from melt pressure are applied to valve pin 20 in a direction to move valve pin 20 toward its open position. Pre-load of spring 38 is adjusted in accordance with the force at which valve pin 20 is to be driven to its open position for pressure relief. Adjustment of pre-load of spring 38 is effected by adjusting ring 43. An internal thread of adjusting ring 43 engages external thread 15 on the exterior of nozzle body 12 permitting setting of relative location of adjusting ring 43 along the length of external thread 15 by rotation of adjusting ring 43. With adjusting ring 43 located to compress spring 38, spring 38 is effective to lock adjusting ring 43 in position on external thread 15 without additional locking elements. Were the magnitude of pre-load to be insufficient to lock adjusting ring 43 in position, locking means, such as a set screw (not shown) would advantageously be added to adjusting ring 43 to provide adequate force to clamp the internal thread against external thread 15. Nozzle 10 further advantageously comprises length adjusting elements for accommodating a range of spacing between components of a mold assembly. While length adjustment may be desirable for any mold assembly, it is particularly advantageous as applied to mold arrangements comprising plural mold assemblies as illustrated in FIG. 1b. In such mold arrangements, spacing establishing the length of segments of sprue bar pairs 98a and 98b, 120a and 120b, and 120c and 120d is dependent in part on the overall dimension known as "shut height" of mold components mating on the parting lines as measured parallel to the direction of travel of movable platens. Providing nozzles of adjustable lengths facilitates use of sprue-bar segments of fixed length for mold assemblies having a range of shut-heights. Nozzles in accordance with the invention are advantageously applied at interfaces of mating conduit segments to control the flow of melt through the segments. In such applications, the nozzles of the mating segments are arranged in opposed fashion, one having a convex nozzle tip and one having a concave nozzle tip, the nozzle tips being seated when the mold assembly is closed. Adjustment of nozzle length permits use of sprue bar segments of fixed length for mold assemblies defining a range of required segment lengths.

Referring again to FIGS. 2a and 3a, an inlet bushing, such as inlet bushing 32, is movably received in nozzle body 12 from nozzle inlet 16. Inlet bushing 32 comprises bushing body 48 through which bushing passage 47 joins bushing inlet 46 and bushing outlet 49. Bushing outlet 49 comprises a nose portion of bushing body 48 received within nozzle passage 14; bushing inlet 46 comprises a stub portion of bushing body 48, the stub portion being joined to a conduit of a mold assembly by, for example, a threaded connection. Adjustment of a maximum overall length of nozzle 10 with inlet bushing 32 is achieved using means for setting the outward extremity of relative location of inlet bushing 32 and nozzle body 12. As shown in FIG. 3, inlet bushing 32 is located at the outward extreme of its range of travel relative to nozzle body 12 defining the maximum overall length of nozzle 10. On mold closure, inlet bushing 32 can move relative to nozzle body 12 towards nozzle tip 19 accommodating spacing between mating sprue bar segments that is less than the overall length of nozzle 10. The adjusting means comprise adjusting pins 37 and 39 together with stop nuts 45. Head ends of adjusting pins 37 and 39 are retained on pin retaining collar 41 by pin retainers 29. The shafts of adjusting pins 37 and 39 pass through adjusting ring 43. The effective length of adjusting pins 37 and 39 spans the distance between a reference surface of nozzle body 12, i.e., adjusting ring 43 and a reference surface of inlet bushing 41, i.e. pin retaining collar 41. Stop nuts 45 are threaded on to the ends of adjusting pins 37 and 39 projecting beyond adjusting ring 43. The extremity of longitudinal extension of inlet bushing 32 relative to nozzle body 12 is established by adjusting the effective length of adjusting pins 37 and 39, establishing a maximum overall length of nozzle 10 with inlet bushing 32. Springs 33 and 35 surround adjusting pins 37 and 39, respectively, and serve as inlet bushing biasing means to resist relative movement of inlet bushing 32 and nozzle body 12 tending to reduce the separation between adjusting ring 43 and pin retaining collar 41. While two adjusting pins are shown, additional adjusting pins and inlet bushing biasing springs may be provided. Advantageously, the overall length of nozzle 10 with inlet bushing 32 is adjusted to be greater than the spacing between mating mold components, such as mating conduit segments, when the mold assembly is closed. Upon closure of the mold assembly, forces applied to nozzle 10 sufficient to overcome the forces exerted by the inlet bushing biasing means compress springs 33 and 35 and move nozzle body 12 and inlet bushing 32 relative to each other to reduce the overall length equal to that spacing.

Continuing with reference to FIGS. 2a and 3a, relative longitudinal location of nozzle body 12 and inlet bushing 32 are adjusted so that with the mold assembly closed, springs 33 and 35 are compressed. With closure of the mold assembly valve tip 28 is separated from outlet 18 allowing melt to pass therethrough. Considering an arrangement of two nozzles with their tips seated, melt is conveyed from nozzle inlet 16 through nozzle outlet 18 of a first (forward) nozzle and from nozzle outlet 18 through nozzle inlet 16 of the second (reverse) nozzle. On mold closure, any difference in melt pressure of residual melt contained within the mated segments will be equalized by flow of melt across the interfaces of seated nozzles. Under the condition that nozzle passage 14 of each nozzle is full of melt, melt pressure applies a force in the direction of nozzle outlet 18 against the inside of nozzle tip 19 and applies a force in the direction of nozzle inlet 16 on the nose portion of inlet bushing 32. Forces acting in the direction of nozzle outlet 18 are additive with the forces exerted by springs 33 and 35 due to the compression thereof, and forces in the direction of nozzle inlet 16 oppose the force of springs 33 and 35. Under the condition that injection does not begin until mold closure is complete, the force of springs 33 and 35 is sufficient to overcome net forces from melt pressure prior to equalization. During filling of mold cavities, melt pressure within the nozzles is determined primarily by the pressure of injection. To prevent movement of nozzle body 12 relative to inlet bushing 32 toward nozzle inlet 16 during mold filling, areas of surfaces determining the effective forces from melt pressure are chosen to insure the forces additive with the force from springs 33 and 35 is greater than the opposing forces. In particular, the cross sectional area of nozzle passage 14 at nozzle tip 19, net of the cross sectional area of valve pin 20, and the cross sectional area of the nose portion of inlet bushing 32 net of the cross sectional area of bushing passage 47 are chosen to achieve a net force from melt pressure that is either additive with the force of springs 33 and 35 or nil. Hence, nozzles of adjustable length in accordance with the invention advantageously maintain a desired nozzle length using pressure of the conveyed melt to overcome forces tending to compress the nozzles during mold filling.

Figure 2B:
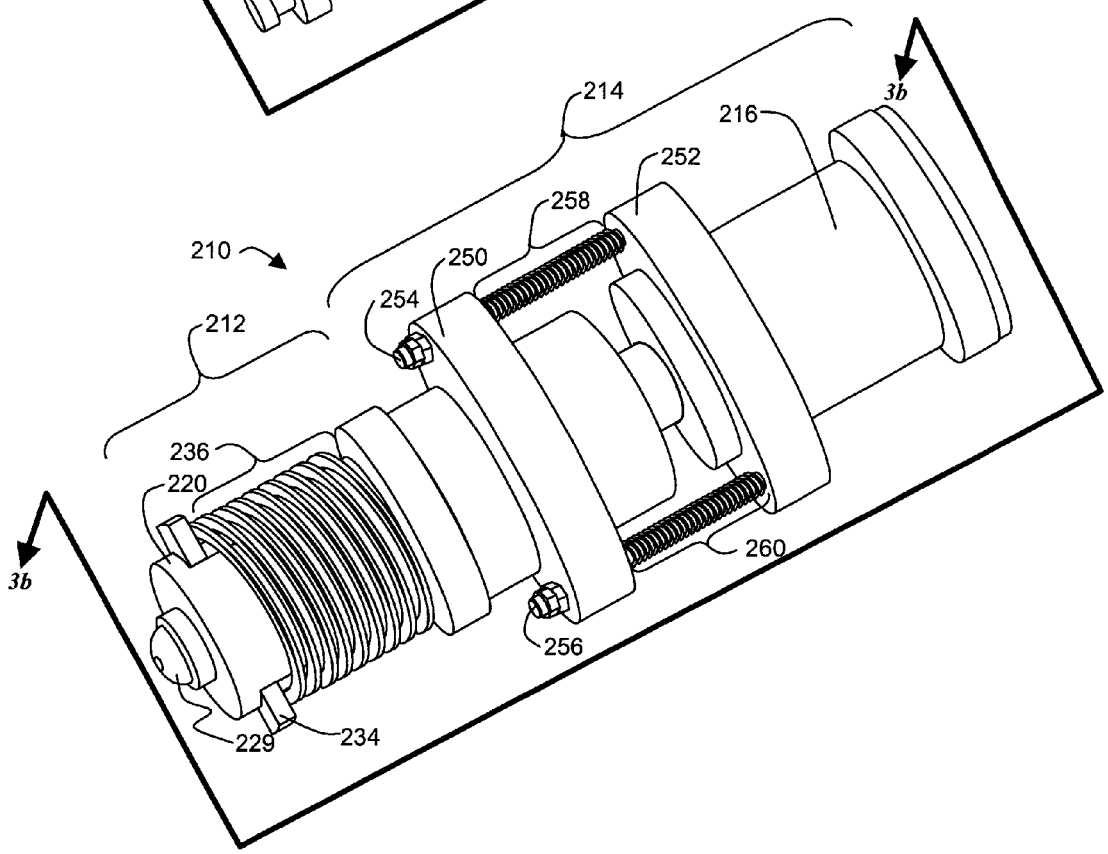
Figure 3B:
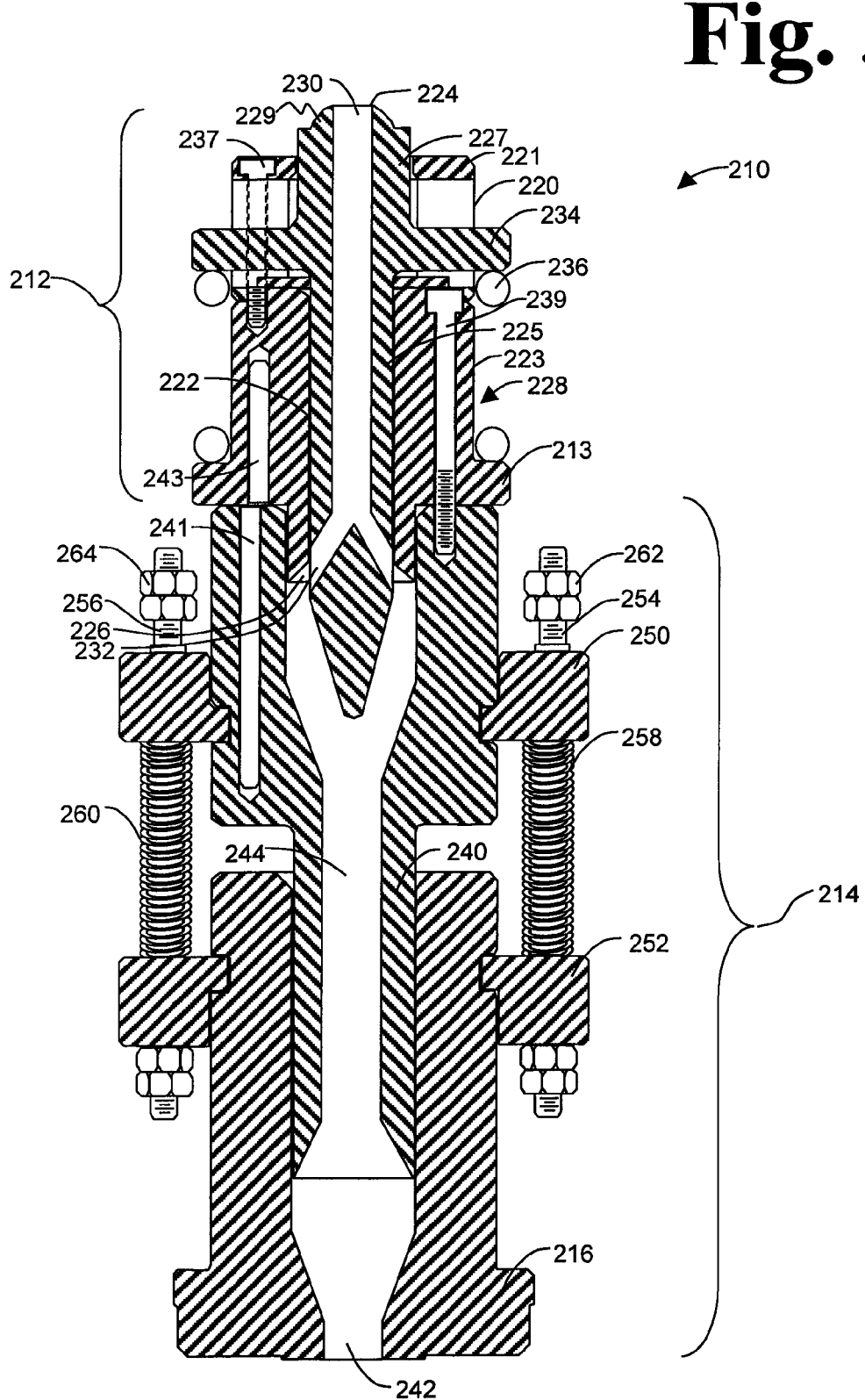
FIG. 3b is a partial sectional view of the sprue bar nozzle assembly of FIG. 2b taken along line 3b-3b of FIG. 2b.

Referring to FIGS. 2b and 3b, a sprue bar nozzle assembly 210 comprises nozzle 212 and sprue bar extension 214. Nozzle 212 comprises nose end 220, nozzle base 223 and nose 227. Nose end 220 is attached to nozzle base 223 by one or more fasteners such as threaded fastener 237, and nozzle base 223 is attached to sprue bar extension 214 by one or more fasteners such as threaded fastener 239. Nozzle base 223 and nose end 220 comprise nozzle valve bore 222 through both and terminating at nozzle outlet 226. Nose 227 comprising nose stem 225 received within nozzle valve bore 222 terminates in seating surface 229 projecting beyond nose end 220 and comprising nozzle inlet 224. Nose 227 and nose stem 225 further comprise nozzle slide valve 228 received within nozzle valve bore 222 and comprising valve passage 230 through nose 227 connecting to slide valve orifices 232 at the end thereof opposite seating surface 229. Slide valve orifices 232 are exposed or covered according to the position of nozzle slide valve 228 relative to nozzle outlet 226. As shown in FIG. 3b, nozzle slide valve 228 is in a position where slide valve orifices 232 are partially exposed. Valve passage 230 terminates at slide valve orifices 232 whereby fluid communication is provided between nozzle outlet 226 and nozzle inlet 224 at seating surface 229. Sprue bar extension 214 comprises extension stem 240 and sprue bar base 216. As installed in a mold assembly such as illustrated in FIG. 1b, sprue bar base 216 is attached to a conduit segment such as segments 118a, 118b, 120a, 120b, 120c and 120d, whereby nozzle 212 is positioned for mating engagement with a mating conduit segment. Sprue bar extension stem 240 is received within base passage 242 through sprue bar base 216 so that extension stem 240 and sprue bar base 216 are slidably engaged. Extension passage 244 through sprue bar extension 214 is in fluid communication with nozzle valve bore 222 at outlet 226 and with base passage 242. Nozzle 212 is attached to sprue bar extension 214 for movement therewith. Melt retained in assembly 210 is maintained in a suitable flowable condition by transfer of heat to the melt from, for example, sprue bar extension 214. Heat may be supplied from supplemental heaters, such as cartridge heaters 241 and 243, received in bores within the walls of sprue bar extension 214 and nozzle base 223, respectively.

Continuing with reference to FIGS. 2b and 3b, nose 227 comprises arm 234 projecting through openings of nose end 220 of nozzle 212. Arm 234 engages spring 236 interposed between arm 234 and shoulder 213 of nozzle 212. As shown, arm 234 comprises two projecting ends on opposite sides of nose 227 whereby moments applied by spring 226 are balanced relative to the longitudinal centerline of nose 227. Spring 236 biases nose 227 to a position within nozzle valve bore 222 where orifices 232 are covered, hence closing nozzle slide valve 228. With opening of an associated mold assembly, forces holding nose 227 in the position to open nozzle slide valve 228 are relieved with relative movement of engaged sprue bar segments away from one another. Force from spring 236 and pressurized melt within sprue bar nozzle assembly 210 drives nose 227 away from sprue bar extension 214 until arm 234 abuts internal lip 221 of nose end 220. In this position, orifices 232 are completely covered, closing nozzle slide valve 228.

Continuing with reference to FIGS. 2b and 3b, sprue bar extension 214 comprises means for adjusting the overall length of sprue bar nozzle assembly 210. Length adjusting pins such as pins 254 and 256 span the distance between stem collar 250 mounted to the exposed periphery of extension stem 240 and base collar 252 mounted to exposed periphery of sprue bar base 216. Springs, such as springs 258 and 260 surround pins 254 and 256 and are interposed between collars 250 and 252 to bias extension stem 240 away from sprue bar base 216. Adjustable stops, such as stop nuts 262 and 264 are threaded onto at least one end of each of pins 254 and 256 projecting beyond collars 250 and 252. As shown stop nuts are threaded onto both ends of pins 254 and 256. Pins with enlarged heads on one end providing a shoulder surface to contact one of collars 250 and 252 and receiving adjustable stops on the opposite ends, such as stop nuts 262 and 264 could be used. Maximum separation of extension stem 240 and sprue bar base 216 is established by the length of pins 254 and 256. The adjustable limit of separation between extension stem 240 and sprue bar base 216 is established by pins 254 and 256, the adjustable stops, and collars 250 and 252. While two adjusting pins are shown, additional adjusting pins and springs may be provided. Advantageously, three or more pins with associated springs are arranged circumferentially around sprue bar extension 214 to balance moments acting on extension stem 240 whereby axial alignment of extension stem 240 and sprue bar base 216 is maintained. An overall length of sprue bar nozzle assembly 210 is established by the separation of extension stem 240 and sprue bar base 216 and adjusted by use of adjusting pins 254 and 256 according to an expected separation of mating sprue bar segments with an associated mold assembly closed. Overall length is adjusted so that compression of springs 258 and 260 will maintain sealing engagement of the mating sprue bar segments prior to admission of melt to the sprue bar nozzle assembly 210 irrespective of variations of fit up attributable to dimensional tolerances and/or dimensional changes due to temperature fluctuations of components. In mold arrangements as illustrated in FIG. 1b, spacing establishing the length of segments of sprue bar pairs 98a and 98b, 120a and 120b, and 120c and 120d is dependent in part on the overall dimension known as "shut height" of mold components mating on the parting lines. Shut height being measured parallel to the direction of travel of movable platens. Providing nozzles of adjustable lengths facilitates use of sprue-bar segments of fixed length for mold assemblies having a range of shut-heights. Valved nozzles are advantageously applied in opposing pairs at interfaces of mating conduit segments to control the flow of melt through the segments. In such applications, the noses of the nozzles of the mating segments are arranged in opposed fashion, one having a convex seating surface such as seating surface 229 and one having a concave seating surface, the noses being seated when the mold assembly is closed. The direction of flow of melt through sprue bar nozzle assembly 210 is a function of where the assembly is applied in a mold assembly such as depicted in FIG. 1b. Hence, nozzle inlet 224 and nozzle outlet 226 of nozzle 212 may be considered reversed according to the direction of flow. It is to be understood that seating surface 229 comprises one of the nozzle inlet and nozzle outlet of nozzle 212 and orifices 232 are covered or exposed according to their position relative to the other of the nozzle inlet and nozzle outlet.

Continuing with reference to FIGS. 2b and 3b, with nozzle slide valve 228 closed, melt is prevented from passing through sprue bar nozzle assembly 210. Upon closure of an associated mold assembly, mating sprue bar segments are brought into contact with one another. Force exerted by spring 236 and resident pressurized melt is overcome as mating sprue bar segments are advanced relative to one another. Nose 227 will be driven in the direction of sprue bar extension 214 until arm 234 contacts a surface opposing internal lip 221. In this position, spring 236 is at its maximum compression and orifices 232 are completely exposed, opening nozzle slide valve 228. Fluid communication is thus established through valve passage 230, orifices 232 and extension passage 244 between inlet 224 and base passage 242. Melt is thereby allowed to pass through sprue bar nozzle assembly 210. Continued relative movement of engaged sprue bar segments will drive sprue bar extension 214 toward sprue bar base 216 against force exerted by springs 258 and 260. During filling of mold cavities, melt pressure within sprue bar nozzle assembly 210 is determined primarily by the pressure of injection. To prevent separation of engaged sprue bar segments during mold filling, areas of interior surfaces determining the effective forces from melt pressure are chosen to insure the forces additive with the force from springs 258 and 260 is greater than the opposing forces. In particular, the cross sectional area of valve passage 230 at seating surface 229 and the cross sectional area of nozzle valve bore 222 are chosen to achieve a net force from melt pressure acting on nose stem 225 and sprue bar extension 214 that is either additive with the force of springs 236, 258 and 260 or nil. Hence, assemblies of adjustable length in accordance with the invention advantageously maintain a desired overall assembly length using pressure of the conveyed melt to overcome forces tending to compress the assembly during mold filling.

While nozzle slide valve biasing means is illustrated as spring 236 (shown as a helical spring in FIG. 2b), other biasing means may be employed without departing from the spirit or scope of the invention. Still further, although not shown in the preferred embodiments, replaceable sealing members may be applied to nozzle slide valve 228 without departing from the spirit and scope of the invention. Such sealing members being selected to provide a seal with nozzle valve bore 222 that accommodates differences in rates of thermal expansion of nose stem 225 pin and nozzle 212 and reduces wear on the nozzle. Additionally, replaceable sealing members may be provided on the periphery of nozzle 212 projecting into extension passage 244 to seal therewith as well as surrounding outlet 226 where nozzle 212 and sprue bar extension 14 abut without departing from the spirit and scope of the invention. Such sealing members being selected to accommodate differences of thermal expansion of nozzle 212 and sprue bar extension 214. Likewise, heating devices, such as heater bands and so called "cartridge" heaters as are known, may be applied externally or internally to the sprue bar-nozzle assembly to maintain melt retained therein in a flowable condition. Other additions and substitutions of elements known to those skilled in the art may be applied to the nozzles and apparatus herein shown and described without departing form the spirit and scope of the invention as claimed.

What is claimed is:

1. A sprue bar nozzle assembly for controlling flow of melt through conduits of a mold assembly, the sprue bar nozzle assembly comprising a sprue bar extension and a nozzle in fluid communication with the sprue bar extension for controlling flow of melt through the sprue bar extension, the sprue bar extension comprising means for adjusting the overall length of the sprue bar nozzle assembly, the nozzle comprising a nozzle valve bore, a nose comprising a seating surface for engagement with a mating surface of a mating segment of a melt conveying conduit, a nozzle slide valve received within the nozzle valve bore and having a valve passage in fluid communication with one of a nozzle inlet and nozzle outlet and terminating in orifices that are covered or exposed according to the location of the slide valve relative to the other of the nozzle inlet and nozzle outlet, an open position of the slide valve permitting melt to flow through the slide valve and nozzle and a closed position preventing melt from flowing through the slide valve and nozzle, an arm projecting from the nozzle slide valve transverse to and passing through an opening in the nozzle, opposed ends of the arm extending beyond the nozzle valve bore, and a biasing means, the biasing means applying a force to the arm in the direction to locate the slide valve to cover the orifices, the nozzle being mounted so that the slide valve is driven to the open position by forces applied to the nose as a result of closure of an associated mold assembly.

2. The assembly according to claim 1 wherein the sprue bar extension comprises a sprue bar base having an extension passage therethrough and an extension stem received within the extension passage so that the extension stem and sprue bar base are slidably engaged.

3. The assembly according to claim 2 wherein the means for adjusting overall length of the sprue bar nozzle assembly further comprises a stem collar fixed to the periphery of the extension stem, a base collar fixed to the periphery of the sprue bar base, at least one pin passing through each of the stem collar and base collar, each pin having an adjustable stop on at least one end projecting beyond a collar and a spring surrounding the pin and interposed between the collars, the adjustable stops, the collars and the pins setting the adjustable limit of separation between the extension stem and sprue bar base, the adjustable limit of separation between the extension stem and sprue bar base establishing the overall length of the sprue bar nozzle assembly.

4. The assembly according to claim 3 wherein the sprue bar extension comprises at least three pins, each having a surrounding spring interposed between the collars, the pins being arranged circumferentially around the sprue bar extension so that axial alignment of the extension stem and sprue bar base is maintained.

5. The assembly according to claim 3 wherein the sprue bar extension comprises at least four pins, each having a surrounding spring interposed between the collars, the pins being arranged circumferentially around the sprue bar extension so that axial alignment of the extension stem and sprue bar base is maintained.

6. The assembly according to claim 1 wherein areas of interior surfaces acted on by melt pressure during mold filling are effective to produce forces additive with the forces exerted by the biasing means acting on the arm and the springs of the adjusting means so that the combined forces are sufficient to overcome forces tending to separate engaged sprue bar segments.

7. The assembly according to claim 1 wherein the seating surface comprises one of the nozzle inlet and nozzle outlet.

8. The assembly according to claim 7 wherein the seating surface comprises one of a convex and concave surface.

9. The assembly according to claim 1 further comprising at least one heater for maintaining melt within the assembly in a flowable condition.

10. The assembly according to claim 9 wherein the heaters comprise at least one cartridge heater received within a bore in a wall of at least one of the nozzle and sprue bar extension.

11. An apparatus for controlling flow of melt through a mold arrangement comprising plural mold assemblies, the apparatus comprising at least one conduit for conveying melt from an injection unit to at least one mold assembly, the conduit comprising mating segments abutted with closure of the mold assemblies and separated with opening of the mold assemblies, at least one of the mating segments comprising a sprue bar nozzle assembly comprising a sprue bar extension and a nozzle in fluid communication with the sprue bar extension for controlling flow of melt through the sprue bar extension, the sprue bar extension comprising means for adjusting the overall length of the sprue bar nozzle assembly, the nozzle comprising a nozzle valve bore, a nose comprising a seating surface for engagement with a mating surface of a mating segment of a melt conveying conduit and a nozzle slide valve received within the nozzle valve bore and having a valve passage in fluid communication with one of a nozzle inlet and nozzle outlet and terminating in orifices that are covered or exposed according to the location of the slide valve relative to the other of the nozzle inlet and nozzle outlet, an open position of the slide valve permitting melt to flow through the slide valve and nozzle and a closed position preventing melt from flowing through the slide valve and nozzle, an arm projecting from the nozzle slide valve transverse to and passing through an opening in the nozzle, opposed ends of the arm extending beyond the nozzle valve bore, and a biasing means, the biasing means applying a force to the arm in the direction to locate the slide valve to cover the orifices, the nozzle being mounted so that the slide valve is driven to the open position by forces applied to the nose as a result of closure of an associated mold assembly.

12. The apparatus according to claim 11 wherein the sprue bar extension comprises a sprue bar base having an extension passage therethrough and an extension stem received within the extension passage so that the extension stem and sprue bar base are slidably engaged, the sprue bar base being attached to a segment of the conduit.

13. The apparatus according to claim 12 wherein the means for adjusting overall length of the sprue bar nozzle assembly further comprises a stem collar fixed to the periphery of the extension stem, a base collar fixed to the periphery of the sprue bar base, at least one pin passing through each of the stem collar and base collar, each pin having an adjustable stop on at least one end projecting beyond a collar and a spring surrounding the pin and interposed between the collars, the adjustable stops, the collars and the pins setting the adjustable limit of separation between the extension stem and sprue bar base, the adjustable limit of separation between the extension stem and sprue bar base establishing the overall length of the sprue bar nozzle assembly.

14. The apparatus according to claim 13 wherein the sprue bar extension comprises at least three pins, each having a surrounding spring interposed between the collars, pins being arranged circumferentially around the sprue bar extension to balance moments acting on the extension stem whereby axial alignment of the extension stem and sprue bar base is maintained.

15. The apparatus according to claim 13 wherein the sprue bar extension comprises at least four pins, each having a surrounding spring interposed between the collars, the pins being arranged circumferentially around the sprue bar extension so that axial alignment of the extension stem and sprue bar base is maintained.

16. The apparatus according to claim 11 wherein interior surfaces of the sprue bar nozzle assembly that are acted upon by melt pressure during mold filling are effective to produce forces additive with the forces exerted by the biasing means acting on the arm and the springs of the adjusting means so that the combined forces are sufficient to overcome forces tending to separate engaged sprue bar segments.

17. The apparatus according to claim 11 wherein the seating surface comprises one of the nozzle inlet and nozzle outlet.

18. The apparatus according to claim 17 wherein the seating surface comprises one of a convex and concave surface.

19. The apparatus according to claim 11 further comprising at least one heater for maintaining melt within the sprue bar nozzle assembly in a flowable condition.

20. The apparatus according to claim 19 wherein the heaters comprise at least one cartridge heater received within a bore in a wall of at least one of the nozzle and sprue bar extension.

* * * * *